US009051893B2

(12) United States Patent
Jung et al.

(10) Patent No.: US 9,051,893 B2
(45) Date of Patent: Jun. 9, 2015

(54) METHOD FOR DETECTING A MALFUNCTION IN AN ELECTRONICALLY REGULATED FUEL INJECTION SYSTEM OF AN INTERNAL COMBUSTION ENGINE

(75) Inventors: Uwe Jung, Wörth a. d. Donau (DE); Matthias Stampfer, Berching (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 194 days.

(21) Appl. No.: 13/638,932

(22) PCT Filed: Mar. 23, 2011

(86) PCT No.: PCT/EP2011/054398
§ 371 (c)(1),
(2), (4) Date: Oct. 1, 2012

(87) PCT Pub. No.: WO2011/120848
PCT Pub. Date: Oct. 6, 2011

(65) Prior Publication Data

US 2013/0019670 A1 Jan. 24, 2013

(30) Foreign Application Priority Data

Mar. 31, 2010 (DE) ......................... 10 2010 013 602

(51) Int. Cl.
*G01M 15/09* (2006.01)
*F02D 41/22* (2006.01)
*F02D 41/38* (2006.01)

(52) U.S. Cl.
CPC .......... *F02D 41/221* (2013.01); *F02D 41/3827* (2013.01); *F02D 41/3836* (2013.01); *F02D 2041/224* (2013.01); *F02D 2041/225* (2013.01); *F02D 2200/0602* (2013.01); *F02D 2200/0604* (2013.01)

(58) Field of Classification Search
CPC ... F02M 65/00; F02M 65/001; F02M 65/002; F02M 65/003; G01M 15/09
USPC ............... 73/114.38, 114.42, 114.43, 114.48, 73/114.51
See application file for complete search history.

(56) References Cited

U.S. PATENT DOCUMENTS 5,974,865 A * 11/1999 Dambach ....................... 73/49.7
7,493,804 B2 2/2009 Achleitner et al. ........ 73/114.41

(Continued)

FOREIGN PATENT DOCUMENTS

DE 19727794 C1 1/1999 .............. F02D 41/04
DE 102004005851 A1 9/2005 .............. F02D 41/22

(Continued)

OTHER PUBLICATIONS

International Search Report and Written Opinion, Application No. PCT/EP2011/054398, 22 pages, Aug. 22, 2011.

(Continued)

*Primary Examiner* — Eric S McCall
(74) *Attorney, Agent, or Firm* — King & Spalding L.L.P.

(57) ABSTRACT

A method is provided for detecting a malfunction in an electronically regulated fuel injection system of an internal combustion engine, by which effective limitation of the cause of the fault in a fuel injection system can take place. For example, it can be determined whether the cause of the fault lies in the low pressure system or in the high pressure system of the fuel injection system.

15 Claims, 2 Drawing Sheets

(56) References Cited

U.S. PATENT DOCUMENTS

| | | | | |
|---|---|---|---|---|
| 8,191,411 | B2 | 6/2012 | Bossemeyer et al. | 73/114.43 |
| 2004/0237937 | A1* | 12/2004 | Joos et al. | 123/457 |
| 2009/0240417 | A1* | 9/2009 | Fushiki et al. | 701/103 |
| 2013/0019670 | A1 | 1/2013 | Jung et al. | 73/114.51 |

FOREIGN PATENT DOCUMENTS

| | | | | |
|---|---|---|---|---|
| DE | 102004028515 | B3 | 11/2005 | F02D 41/22 |
| DE | 102005043971 | A1 | 3/2007 | F02M 65/00 |
| DE | 19622757 | B4 | 5/2007 | F02D 41/06 |
| DE | 102008017160 | B3 | 7/2009 | F02D 41/00 |
| EP | 0860601 | A2 | 8/1998 | F02D 41/22 |
| EP | 1039117 | A2 | 9/2000 | F02D 41/22 |
| WO | 01/81746 | A1 | 11/2001 | F02D 41/22 |
| WO | 2011/120848 | A1 | 10/2011 | F02D 41/22 |

OTHER PUBLICATIONS

German Office Action, Application No. 10 2010 013 602.6, 6 pages, Mar. 26, 2012.

* cited by examiner

METHOD FOR DETECTING A MALFUNCTION IN AN ELECTRONICALLY REGULATED FUEL INJECTION SYSTEM OF AN INTERNAL COMBUSTION ENGINE

CROSS-REFERENCE TO RELATED APPLICATIONS

This application is a U.S. National Stage Application of International Application No. PCT/EP2011/054398 filed Mar. 23, 2011, which designates the United States of America, and claims priority to German Application No. 10 2010 013 602.6 filed Mar. 31, 2010, the contents of which are hereby incorporated by reference in their entirety.

TECHNICAL FIELD

This disclosure relates to a method for detecting a malfunction in an electronically regulated fuel injection system of an internal combustion engine.

BACKGROUND

In modern motor vehicles, the fuel injection systems used make a major contribution to fulfilling demanding customer and legal requirements in respect of fuel consumption and emissions of unwanted pollutants. Modern motor vehicles of this kind have self-ignition internal combustion engines which operate with a common rail diesel injection system, for example.

Faults which occur in such systems, e.g. leaks, mechanical component failure, contamination etc., often lead to unwanted vehicle behavior, e.g. a loss of power, increased pollutant emissions or activation of a fault memory lamp. Faults of this kind can occur or have their origin in the low pressure area of the respective vehicle or in the high pressure area of the respective vehicle.

Known onboard diagnostic systems have only a limited ability to determine the exact cause of a fault in the injection system or at least localize it more precisely without having a negative effect on the behavior of the overall injection system during diagnosis, especially when dynamic operating conditions are present. In addition, precise location of a cause of a fault is considerably restricted by the fact that only a limited number of items of onboard sensor information are available.

One consequence of the abovementioned problems is that components are often replaced unnecessarily in a workshop for lack of a precise knowledge of the cause of a fault. For example, a functional high pressure pump may be replaced even though the unwanted system behavior has been caused by a blocked fuel filter.

Moreover, the practice of attaching additional sensors to the fuel injection system and carrying out manual tests for diagnostic purposes in a workshop is already known. However, this is associated with a large outlay on analytical equipment for the respective workshop, this in turn increasing the readiness to unnecessarily replace components which are actually functional. In addition, manual interventions in the high pressure system of a motor vehicle often lead to contaminants being introduced into the system or to components of the system being damaged.

DE 197 27 794 C1 has already disclosed a method for checking a fuel supply system in a motor vehicle, said system delivering fuel from a fuel pump to an injection system of an internal combustion engine. In this known method, a change in the fuel pressure in the fuel line over time after the internal combustion engine is switched off by switching off the fuel pump and injection system is monitored for a predetermined period of time . The change in the fuel pressure is compared with a comparison characteristic, which depends on the temperature of the fuel. If there is a deviation of more than a predetermined tolerance range, a malfunction is detected. By means of this known method, malfunctions in the high pressure area of the injection system are detected. However, there is no possibility of making judgments on faults in the low pressure area.

DE 196 22 757 B4 has disclosed a method and a device for detecting a leak in a fuel supply system of an internal combustion engine having high pressure injection. Here, the fuel is delivered from a low pressure area to a high pressure area by at least one pump. The pressure in the high pressure area can be controlled by at least one pressure control means. To detect the pressure in the high pressure area, a pressure sensor is provided. When the internal combustion engine is started, at least one of the pressure control means can be activated in such a way that, in the fault-free state, the pressure rises to an expected value. The presence of a fault is inferred if the pressure value detected does not reach the expected pressure value within a predetermined period of time. This known method makes it possible to detect a fault in the injection system. It is not possible to differentiate between the high pressure side and the low pressure side. Moreover, the potential for detection is limited since, after the internal combustion engine is started, the low starter speed which is then present leads to only a relatively low flow through the pump. The result is that the causes of faults which have an effect on the behavior of the vehicle only at higher flow rates, e.g. a blocked fuel filter, cannot be detected. Moreover, the maximum permissible fuel pressure is severely limited in the presence of the comparatively low starter speed in order to ensure adequate pump lubrication despite the low flow through the pump. This has the effect that it is not possible to evaluate the entire pressure range by means of the known method, and hence the number of detectable causes of faults is limited.

SUMMARY

In one embodiment, a method for detecting a malfunction in an electronically regulated fuel injection system of an internal combustion engine may comprise: carrying out a test routine, in which an increase and a subsequent reduction in the pressure of the fuel in the high pressure system of the fuel injection system is carried out, wherein various parameters of the fuel injection system are detected and stored as part of the test routine, and wherein the stored parameters are used in a subsequent evaluation process to detect a malfunction, wherein the following relation is evaluated during the evaluation process:

where:

$$dV = \text{Qin} - \text{Qout};$$

$$Ep = f(\text{PSys}, T, \text{fuel quality});$$

$$\text{VSys} = \text{const.}$$

and wherein PSys is the fuel pressure in the high pressure system, Ep is the pressure-dependent elastic modulus of the fuel, VSys is the volume of the high pressure system, Qin is the fuel volume flow output by the volume flow control valve and Qout is the total outflow of fuel from the fuel injection system.

In a further embodiment, the instantaneous fuel pressure is measured and the average and/or instantaneous gradient over time dPSys,DEC/dt is determined during the falling of the fuel pressure. In a further embodiment, the instantaneous fuel pressure is measured and the average and/or instantaneous gradient over time dPSys,Inc/dt is determined during the increasing of the fuel pressure. In a further embodiment, a normalized instantaneous and/or average gradient over time is formed:

[dPSys,Inc/dt]Norm=dPSys,Inc/dt+dPSys,Dec/dt.

In a further embodiment, the malfunction in the high pressure system of the fuel injection system and the malfunction in the low pressure system of the fuel injection system are detected in the evaluation process and assigned unambiguously to one of these two subsystems. In a further embodiment, the malfunction is assigned to an individual component of the fuel injection system in the evaluation process. In a further embodiment, a number of successive steps are performed in the test routine, wherein, in a first step, a constant fuel pressure in the high pressure system is set by pressure regulation, and, in a second step, the volume flow control valve of the fuel injection system is opened and—where present—the pressure control valve of the fuel injection system is closed. In a further embodiment, the method further includes increasing the fuel pressure in the high pressure system to a predetermined upper limiting value, and then closing the volume flow control valve and deactivating the process of injection into the cylinders of the fuel injection system. In a further embodiment, the method further includes specifying a delay time, within which the internal combustion engine comes to a halt. In a further embodiment, the method further includes fuel pressure falling to a predetermined lower threshold value. In a further embodiment, the method includes a further step in which a 11. The method as claimed in one of the preceding claims, wherein a further step is the evaluation process. In a further embodiment, the text routine is carried out in a predetermined operating range. In a further embodiment, the predetermined operating range is operation at a constant set engine speed and a constant set load. In a further embodiment, the predetermined operating range is the idling mode. In a further embodiment, the test routine is carried out for different fuel and/or engine and/or coolant temperatures.

BRIEF DESCRIPTION OF THE DRAWINGS

Example embodiments will be explained in more detail below with reference to figures, in which.

DETAILED DESCRIPTION

Figure 1:
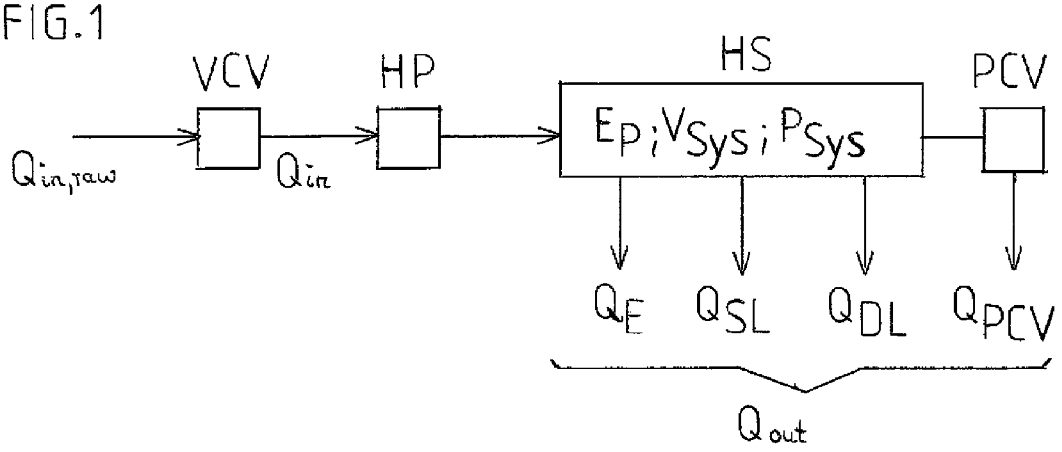
FIG. 1 shows a sketch intended to illustrate the fuel volume flows flowing in a fuel injection system.

Some embodiments provide a method for detecting a malfunction in an electronically regulated fuel injection system of an internal combustion engine which allows improved localization of the causes of the fault.

Certain embodiments of the method disclosed herein may provide effective localization of the cause of a fault in a fuel injection system. For example, in some embodiments it is possible to localize both faults occurring in the high pressure system of the fuel injection system and in the low pressure system of the fuel injection system. If carrying out a method as disclosed herein shows that the fuel injection system is operating without faults, analysis of the cause of a fault can then focus on other engine subsystems, e.g., the air path. On the other hand, it is also possible, if required, to carry out specifically tailored further tests in the localized area of the fuel injection system in which there is a malfunction in order ultimately to be able effectively to determine the exact cause of the fault and then to eliminate it. As part of a further test, for example, a manual check can be performed on the fuel filter. One possible way of eliminating an identified cause of a fault can be, for example, applying a leak spray.

In some embodiments, the method disclosed herein may be carried out in a motor vehicle workshop and may be used to ensure that components of the fuel injection system which are actually functional are not unnecessarily replaced in the workshop on the basis of suspicion.

Some embodiments provide a method for detecting a malfunction in an electronically regulated fuel injection system of an internal combustion engine. A fuel injection system of this kind is, for example, a common rail diesel injection system. In a system of this kind, fuel is passed from a fuel tank via a pre-supply pump, a fuel filter and a volume flow control valve into a high pressure system, which has a high pressure pump, a high pressure fuel line, a high pressure accumulator and injectors, which inject fuel into the cylinders of the internal combustion engine. The injectors have leakage lines, for example, leading back to the fuel tank. Arranged in the high pressure system is a pressure sensor, which is connected by a signal line to a control unit. This is connected by further control lines to the injectors and by one or more data lines to the controller of the internal combustion engine. A temperature sensor, which is connected to the control unit by a data line and is provided for measurement of the fuel temperature, is provided in a low pressure line.

Moreover, the control unit can be connected by a control line to a pressure control valve, which is connected to the high pressure system downstream of the high pressure pump. The pressure control valve is connected to a leakage line. As the motor vehicle is being driven, for example, the control unit regulates the fuel pressure in the high pressure system by means of the pressure control valve as a function of load, engine speed and driver requirements. Moreover, the control unit controls the injectors for the purpose of correct injection of fuel into the individual cylinders of the internal combustion engine.

In a fuel injection system of this kind, fuel volume flows flow as explained below with reference to FIG. 1. This shows a sketch intended to illustrate the fuel volume flows flowing in a fuel injection system.

In FIG. 1, Qin,raw designates the fuel volume flow delivered by the pre-supply pump. This volume flow reaches the volume flow control valve VCV, the state of opening of which is set by the control unit of the system in the respectively desired manner. The fuel volume flow Qin leaving the volume flow control valve VCV is fed to the high pressure accumulator HS of the system via the high pressure pump HP of the system. The total fuel volume flow leaving the high pressure accumulator, which corresponds to the system consumption, is designated by Qout and is composed of the fuel volume flow QE brought about by the processes of injection into the cylinders, the fuel volume flow QPCV, where present, output by the pressure control valve PCV, the fuel volume flow QDL emerging due to permanent leakage, and the fuel volume flow QSL emerging due to switching leakage:

$$Qout=QE+QPCV+QDL+QSL.$$

For the explanations which follow, the elastic modulus EP (Ep=f(T, PSys, fuel quality)) of the fuel, the volume VSys of the high pressure accumulator HS and the fuel pressure PSys in the high pressure accumulator HS are furthermore of significance.

According to some embodiments, a malfunction in an electronically regulated fuel injection system of an internal combustion engine is detected, wherein first of all a predetermined operating range is set, e.g. the idling mode, and then a test routine is carried out, in which first an increase and then a reduction in the pressure of the fuel in the high pressure system of the fuel injection system is carried out. As part of this test routine, various parameters of the fuel injection system are detected and stored. In a subsequent evaluation process, the stored parameters are used to detect a malfunction of the fuel injection system. In some embodiments, the predetermined operating range is operation with an engine speed set to a constant level and a load set to a constant level, e.g., the idling mode, in which a constant engine speed of, for example, 800 revolutions per minute is set by means of an idle speed stabilizer. In some embodiments, the disclosed method may be carried out in a workshop but can also be carried out elsewhere or in actual driving conditions, e.g., where steady-state vehicle operating conditions, e.g. long idling phases, are present.

By carrying out said test routine, it is possible to assess, where there is unwanted vehicle behavior for example, to what extent, on the one hand, the fuel injection system itself is fault-free and hence the cause is to be sought in some other engine subsystem. On the other hand, the cause of the fault in a faulty fuel injection system, which fault can be in the high pressure system or in the low pressure system, is localized, the disclosed method thus forming a starting point for any further targeted analysis and repair measures that may be necessary.

Before carrying out the disclosed method, other test routines or, alternatively, manual checks, e.g., a visual check for leaks in the high pressure pump, may be carried out to exclude or reduce the possibility of serious faults that fundamentally prevent reliable operation of the engine. These include, for example, the presence of a faulty starter and complete blockage of the high pressure pump, preventing a pressure buildup. They also include cylinder-specific faults that affect the stability of the engine speed and/or fuel volume flows QE and QSL, e.g. a loss of compression or an injector fault in respect of the injection quantity or the switching leakage. This means, inter alia, that the injection quantities specified by the control unit must be implemented with at least approximate accuracy, this being a prerequisite for correct determination of QE and QSL from the activation values.

A predetermined operating range, e.g. an idling mode at a constant engine speed of 800 revolutions per minute and with a constant load, is set by means of an appropriate intervention, e.g. by means of an idle speed stabilizer.

According to one embodiment, a special combustion mode or special activation of injection can be set for the test routine, e.g. a mode involving a reduced combustion efficiency through retardation of the start of injection.

According to another embodiment, it is also possible for the test routine to be carried out several times for different operating or operation ranges. This other embodiment may be advantageous because certain causes of faults have an effect on system behavior only in certain operating or operation ranges.

According to further embodiments, it is also possible for the test routine to be carried out for different fuel and engine or coolant temperatures since the volumetric efficiency of the high pressure pump and also the switching leakage and permanent leakage are dependent on temperature.

Figure 2:
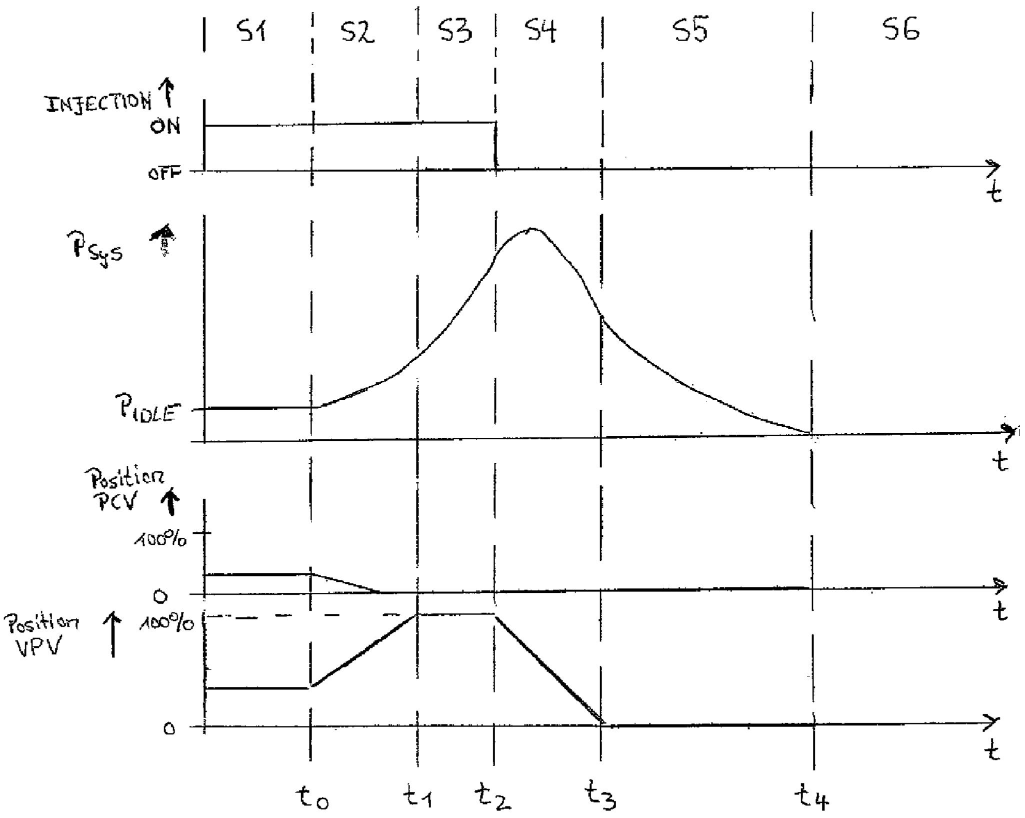
FIG. 2 shows diagrams intended to illustrate the progress of a test routine over time and FIG. 3 shows an example of the variation of the fuel pressure in the high pressure system of the fuel injection system over time.

Diagrams intended to illustrate the progress of a test routine according to one illustrative embodiment over time will be explained below with reference to FIG. 2. As part of this test routine, a number of steps are performed, during which various parameters are determined and stored. These parameters are then used in a concluding evaluation process in order to detect whether or not there are faults in the fuel injection system and to detect whether these faults are in the high pressure system or in the low pressure system of the system. As part of this evaluation, said parameters are compared with expected values which, in turn, are derived from characteristic maps dependent on the operating point, e.g. engine speed maps, maps for the engine temperature and maps for the fuel temperature.

If the predetermined operating range, e.g. the idling mode, is set, then, in a first step S1, which is performed in the time period between t=0 and t=t0, the vehicle is operated in the set operating range for a period of, for example, 10 seconds in order to bring about system stabilization. In this first step S1, the fuel pressure in the high pressure system is regulated by means of the control unit in such a way that there is an approximately constant system pressure PSys in the high pressure system, wherein the following relation applies:

$$Qin=Qout=QPCV+QE+QSL+QDL.$$

For this regulating process, the control unit activates the volume flow control valve VCV and, if appropriate, the pressure control valve PCV in the respectively required manner.

In a subsequent, second step S2, which extends from t=t0 to t=t1, electronic interventions in the actuator activation are used, on the one hand, to completely close the pressure control valve PCV, where a pressure control valve of this kind is present, and, on the other hand, to open the volume flow control valve VCV. During this process, appropriate delay times must be allowed in order to ensure that said valves have in fact reached the end positions set.

In a subsequent, third step S3, which extends from t=t1 to t=t2, a rise in the fuel pressure in the high pressure system up to a predetermined upper limiting value is carried out. Here, the inflow of fuel Qin,raw is no longer limited by the volume flow control valve and no fuel flows out through the pressure control valve. The following therefore applies:

$$Qin>Qout.$$

Consequently, the system pressure PSys rises in a defined manner until the predetermined upper limiting value has been reached. This upper limiting value corresponds, for example, to the maximum permissible system pressure minus a safety tolerance. As an alternative to this, it is also possible for the system pressure to rise in a defined manner until a certain duration of the rise has been achieved. The volume flow control valve VCV is then completely closed and injection is completely deactivated for all the cylinders by means of electronic actuator interventions. The pressure control valve PCV remains closed.

During said pressure rise phase up to the predetermined upper limiting value, the instantaneous gradient and the average gradient over time dPSys,INC/dt are determined from the fuel pressure value in the high pressure system measured by means of a pressure sensor. If the pressure control valve or a pressure limiting valve has remained stuck in an open position above a certain pressure, for example, then it is furthermore impossible for a higher system pressure to be built up. In such a case, a fault indication is stored at this early stage after a predetermined waiting period, given an appropriate system pressure.

In a subsequent, fourth step S4, which extends from t=t2 to t=t3, a delay time is implemented, within which a system stabilization takes place. This step is carried out because there is still a small quantity of fuel being pumped into the high pressure system up to complete closure of the volume flow control valve VCV and complete deactivation of injection and up to stoppage of the engine and because a small quantity of fuel is also still being injected into the cylinders. At time t=t3, this system stabilization is complete.

In a subsequent, fifth step S5, which extends from t=t3 to t=t4, the fuel pressure in the high pressure system, i.e. the system pressure, falls to a predetermined lower limiting value. In the case of a stationary engine, the only outflow of fuel is that due to the permanent leakage: Qout=QDL. As a result, the system pressure PSys falls. The measured pressure in the high pressure system is used to determine the instantaneous and the average pressure drop gradient dPSys,DEC/dt. This continues until the lower predetermined limiting value is reached, which is ambient pressure, for example. According to one embodiment, the instantaneous gradient, the system pressure itself or the pressure drop time can be compared as an evaluation criterion with respectively associated minimum and maximum expected values during the pressure buildup itself. This can be performed as a function of the fuel temperature, the engine temperature or the fuel pressure and stored as a fault indication.

In a subsequent, sixth step S6, which takes place after time t=t4, evaluation is performed, in which the stored parameters are evaluated in order to detect a malfunction. As part of this evaluation, a detected fault is assigned to the high pressure system or to the low pressure system of the fuel injection system.

As part of this evaluation, use is made of the following relation:

where:

$$dV = \text{Qin} - \text{Qout};$$

$$Ep = f(\text{PSys}, T, \text{fuel quality});$$

$$\text{VSys} = \text{const}.$$

According to one embodiment, evaluation is carried out as follows:

As part of a first evaluation step, which corresponds to an evaluation of the pressure reduction behavior, the high pressure system is assessed predominantly by means of the parameters determined in step S5.

According to the initial conditions, cylinder-specific faults in the high pressure system which affect QE and QSL are excluded. The only possible causes of faults that remain, therefore, are those which influence QPCV and QDL.

If an existing pressure control valve PCV has remained stuck in the open position from a certain pressure, this has already been detected in step S3. Given a corresponding fault indication, a fault of the pressure control valve PCV, in the form of the “FAIL” indication for example, has been stored in a first partial evaluation step of the high pressure system.

Moreover, the above fundamental relationship is employed here in a simplified form in a main evaluation step of the high pressure system since—as already explained in conjunction with step S5—the following relation applies: Qout=QDL. If the mean or stored instantaneous fall gradient or one of the further evaluation criteria described exceeds or undershoots the respectively associated minimum or maximum expected values, a “FAIL” indication is stored, designating the high pressure system as faulty.

If the gradient during the pressure drop exceeds the gradient expected for this only up to a certain pressure value, this is additionally stored as an indication of a pressure-dependent leakage in a second partial evaluation step of the high pressure system. This leakage can be caused, for example, by a reduced spring stiffness of the pressure limiting valve of the fuel injection system.

If the gradient and the further evaluation criteria, on the other hand, are always within the respectively associated expected range, a “PASS” indication is stored, designating the high pressure system of the fuel injection system as fault-free.

The above-described status information on the high pressure system can be transmitted to the workshop via the OBD interface, thus enabling further-reaching targeted analysis and repair to be carried out if required.

As part of a second evaluation step, which corresponds to an evaluation of the pressure buildup behavior, the low pressure system is assessed. Here, the same initial conditions apply as in the first evaluation step.

As part of this second evaluation step, the relation indicated above in respect of the mean or average rise gradient determined in step S3 is rearranged as follows, wherein either the instantaneous or the average values should in each case be used consistently for determining the expected pressure rise gradient:

For the actual assessment, the gradients dPSys,Inc/dt determined in step S3 are compared with the expected values that apply for the respective operating point. For this purpose, the following embodiments can be used for determining the individual pressure-dependent fuel volume flows:

- The fuel volume flow Qin can be determined in accordance with the permissible efficiency range of the high pressure pump, e.g. from the hardware specification of the high pressure pump.
- The fuel volume flow QPCV has been eliminated by the intervention at the pressure control valve and consequently has no effect.
- On the one hand, the fuel volume flows QE and QSL can be determined from the operating-point-dependent characteristic maps for the injection times and the switching leakage. According to another embodiment, it is also possible for them to be determined from a high-resolution high pressure accumulator sensor signal, e.g. with a sampling rate of one millisecond. For this purpose, the engine is, for example, operated at idle with different pressure levels in the high pressure system, e.g. at 300 bar, 500 bar, . . . , 1500 bar, . . . , maximum system pressure, and the measured pressure signals are analyzed in detail at the respective pressure level.

Figure 3:
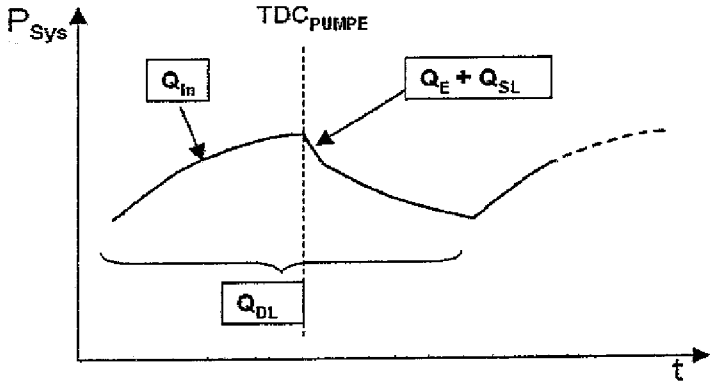

FIG. 3 shows one example of the variation over time of the fuel pressure in the high pressure system of the fuel injection system. In this diagram, the time t is plotted on the abscissa, while the system pressure PSys is plotted on the ordinate. For the sake of simplicity, the start of injection will coincide in this illustration with top dead center TDCPumpe of the high pressure pump. First of all, it is known that the permanent leakage QDL is continuously present. Up to the time TDCPumpe, a certain pressure is built up by the working stroke of the high pressure pump, as indicated in the subsection of the illustrated curve designated by Qin. From this time TDCPumpe onwards, pressure is reduced again as part of injection by the volume flows QSL and QE, and the steep pressure gradient can be determined. After the end of injection, only the volume flow due to the permanent leakage QDL is present until the beginning of the next pump working stroke . By subtracting QDL, it is thus finally possible to determine the sum of QSL and QE from the steep pressure gradient during injection. Further subdivision into the individual elements is not required for further evaluation. To eliminate signal noise, the analysis described of the fuel pressure variation in the high pressure system is repeated several times for each of the pressure levels to be evaluated.

On the one hand, the fuel volume flow QDL can be determined from the operating-point-dependent characteristic map for the permanent leakage. As an alternative, the fall gradients dPSys,DEC/dt determined in step S5 can be used directly. A further alternative includes determining QDL as part of the above analysis relating to QSL and QE. These last two alternatives may eliminate pressure-dependent leakage present in the high pressure system from the calculation for the evaluation in the low pressure system, such that this leakage does not affect the test result.

If, as part of the main evaluation step of the low pressure system, the mean or stored instantaneous rise gradients dPSys,Inc of one of the further evaluation criteria, e.g. the system pressure itself or the pressure buildup time, exceed or undershoot the respectively associated maximum or minimum expected values, then a "FAIL" indication is stored for the low pressure system to indicate the presence of a fault in the low pressure system.

If the instantaneous gradient during the pressure buildup undershoots the expected gradient only from a certain pressure value, this is in turn additionally recorded as an indication of a pressure-dependent leakage in a partial evaluation step for the low pressure system, this pressure-dependent leakage possibly being caused by a reduced spring stiffness of the pressure limiting valve, for example.

If, on the other hand, the gradient and the further evaluation criteria are always within the corresponding expected range, a "PASS" indication is stored, designating the low pressure system as fault-free.

This status information from the low pressure system is made available to the workshop via the OBD interface, thus enabling further, targeted analysis and repair to be carried out there if required.

Thus, the following conclusions can be drawn from the results of the various main and partial evaluation steps as part of a targeted fault tracing operation in the workshop:

If all the evaluation steps give the "PASS" indication, then the entire fuel injection system is in the fault-free state.

If an evaluation of the pressure buildup behavior gives the "FAIL" indication and an evaluation of the pressure reduction behavior gives the "PASS" indication, the cause of the fault is in the low pressure system.

By virtue of the principle involved, the occurrence of the "PASS" indication in respect of the pressure buildup behavior and the "FAIL" indication in respect of the pressure reduction behavior is not possible.

If both main evaluation steps give the "FAIL" indication, the cause of the fault is in the high pressure system.

If there is additionally or exclusively a "FAIL" result in one or more of the partial evaluation steps, the corresponding cause of the fault can be inferred directly.

Forming a normalized instantaneous and/or average gradient over time

[dPSys,Inc/dt]Norm=dPSys,Inc/dt+dPSys,Dec/dt may eliminate interfering factors in the high pressure system (faults, tolerances) affecting the pressure buildup behavior.

What is claimed is:

1. A method for detecting a malfunction in an electronically regulated fuel injection system of an internal combustion engine having a high-pressure pump, a high pressure system downstream of the high-pressure pump and including a high-pressure accumulator, a pressure control valve, and a plurality of fuel injectors, the method comprising:

performing a test routine, including controlling (a) a volume control valve upstream of the high-pressure accumulator and (b) the pressure control valve of the high pressure system downstream of the high-pressure pump to effect an increase and a subsequent decrease in a pressure of the fuel in the high pressure system of the fuel injection system, wherein the test routine includes:

closing the pressure control valve downstream of the high-pressure pump while the volume control valve is open, resulting in an increase in the pressure of the fuel in the high pressure system, deactivating the plurality of fuel injectors, and closing the volume control valve while the pressure control valve remains closed, resulting in a decrease in the pressure of the fuel in the high pressure system, wherein the internal combustion engine remains running throughout the test routine, detecting various parameters of the fuel injection system and storing the detected parameters as part of the test routine, based on the detected parameters, calculating at least one fuel pressure gradient during at least one of the increase in the fuel pressure and the subsequent decrease in the fuel pressure effected during the test routine, and detecting a malfunction in the fuel injection system based on the calculated at least one fuel pressure gradient.

2. The method of claim 1, comprising:

measuring an instantaneous value of the fuel pressure, and determining at least one of an average gradient and an instantaneous gradient during the reduction of the fuel pressure.

3. The method of claim 1, comprising:

measuring an instantaneous value of the fuel pressure, and determining at least one of an average gradient and an instantaneous gradient during the increasing of the fuel pressure.

4. The method of claim 1, comprising determining at least one of a normalized instantaneous gradient and an average gradient over time.

5. The method of claim 1, comprising determining, based at least on the calculated at least one of the fuel pressure gradient, whether the detected malfunction exists in the high pressure system of the fuel injection system or in a low pressure system of the fuel injection system.

6. The method of claim 1 comprising assigning the detected malfunction to an individual component of the fuel injection system.

7. The method of claim 1, wherein the test routine comprises a number of successive steps, including:

in a first step, setting a constant fuel pressure in the high pressure system by pressure regulation, and in a second step, opening the volume flow control valve of the fuel injection system.

8. The method of claim 7, wherein the test routine further comprises, in the second step, closing a pressure control valve of the fuel injection system.

9. The method of claim 1, comprising:

increasing the fuel pressure in the high pressure system to a predetermined upper limiting value, and closing the volume flow control valve and deactivating injection of fuel via the plurality of fuel injectors.

10. The method of claim 1, comprising specifying a delay time within which the internal combustion engine comes to a halt.

11. The method of claim 1, wherein the fuel pressure falls to a predetermined lower threshold value.

12. The method of claim 1, wherein the test routine is carried out for different temperatures of at least one parameter selected from the group consisting of fuel temperature, engine temperature, and coolant temperature.

13. The method of claim 1, wherein the test routine is carried out in a predetermined operating range.

14. The method of claim 13, wherein the predetermined operating range comprises operation at a constant set engine speed and a constant set load.

15. The method of claim 13, wherein the predetermined operating range comprises an idling mode.

* * * * *